F. KUHN.
ELECTRIC COOKING UTENSIL.
APPLICATION FILED APR. 5, 1912.
1,047,088.
Patented Dec. 10, 1912.
2 SHEETS—SHEET 1.
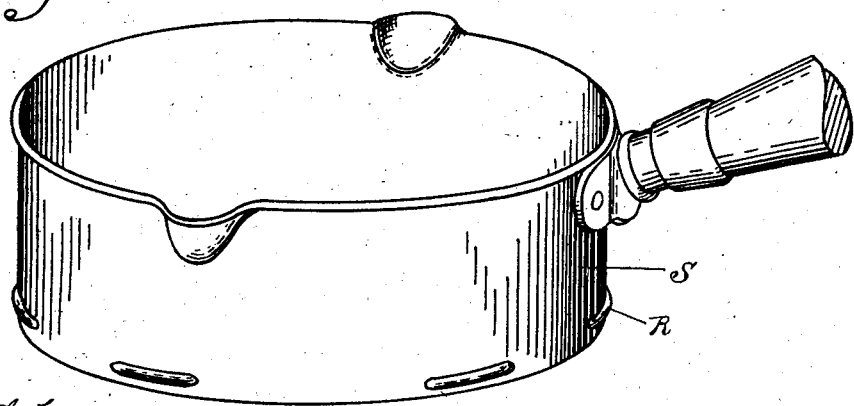
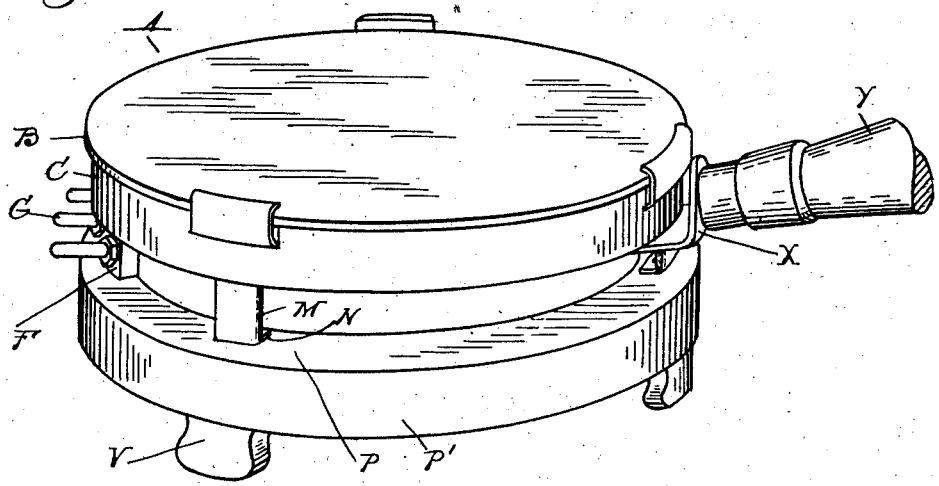

F. KUHN.
ELECTRIC COOKING UTENSIL.
APPLICATION FILED APR. 5, 1912.
1,047,088.
Patented Dec. 10, 1912.
2 SHEETS—SHEET 2.
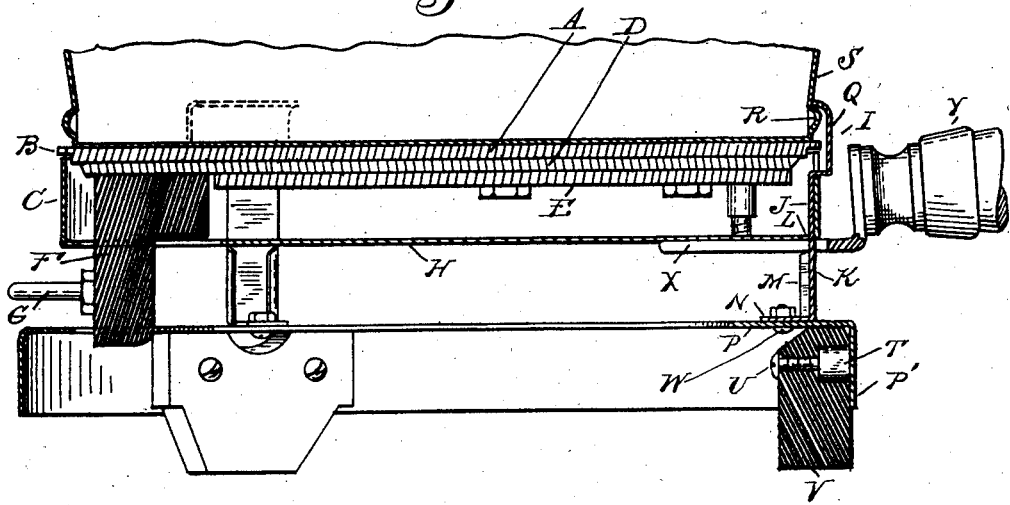
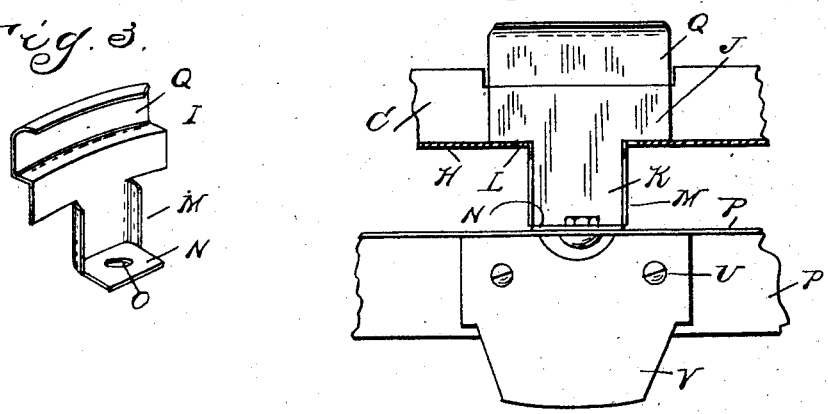

UNITED STATES PATENT OFFICE.

FRANK KUHN, OF DETROIT, MICHIGAN.

ELECTRIC COOKING UTENSIL.

1,047,088.  Specification of Letters Patent.  Patented Dec. 10, 1912.

Application filed April 5, 1912. Serial No. 688,602.

*To all whom it may concern:*

Be it known that I, FRANK KUHN, a citizen of the United States of America, residing at Detroit, in the county of Wayne and State of Michigan, have invented certain new and useful Improvements in Electric Cooking Utensils, of which the following is a specification, reference being had therein to the accompanying drawings.

The invention relates to electric cooking utensils designed for use in various cooking operations, and the invention consists in certain features of construction as hereinafter set forth.

In the drawings,—Figure 1 is a perspective view of the heater stand with the food container detached; Fig. 1ª is a similar view of the food container; Fig. 2 is a vertical central section therethrough; Fig. 3 is a perspective view of one of the supporting legs of the stand; Fig. 4 is an elevation of said leg as attached to the stand and also showing the means for securing the foot to the stand.

My improved utensil is one of the type employing a flat heating disk or hot plate on which the food containing vessel is placed and to which it is clamped to obtain the best heat conduction. This hot plate is supported by a stand which is so designed as to guard against heat losses in a downward direction and which is provided with a handle by which the stand may be carried.

In detail, A is the hot plate having a peripheral flange B resting upon a cylindrical flange C of an inclosing casing for the heating unit. This unit D is clamped to the bottom of the hot plate with a heat distributing plate E therebeneath of substantially equal thickness to that of the hot plate and which prevents warping of the latter. The unit and the heat distributing plate are out of contact with the flange C of the case so that the amount of heat conduction is limited to the restricted contacting surface of the edge of said flange on the peripheral flange B.

F is an insulator block secured to and depending from the heating unit, and G are terminals mounted on said block for connection with the external circuit.

It is one of the objects of the invention to simplify and cheapen the construction of the supporting stand. To this end the flange C is integral with a sheet metal cup-shaped stamping having a bottom H which incloses the space beneath the hot plate and heating unit.

I are leg members formed of sheet metal stampings which have segmental portions J lying adjacent to the inner face of the flange C, and downward projections K that pass through slots L in the bottom H. These downward projections have inwardly turned rounded flanges M to avoid sharp edges and to stiffen the structure. There is also a laterally bent bottom flange N which is apertured at O for a clamping bolt which secures it to a base ring P. At the upper end of the member I is an outwardly and inwardly bent and upwardly extending segmental flange Q which is adapted to engage with outwardly pressed cam-shaped beads R on the food holding vessel S, the arrangement being such that by a rotation of said vessel the beads R will engage with the flanges Q to clamp the vessel to the hot plate.

To lessen the number of parts and to simplify the operation of assembling, the members I are attached to the flanges C by spot welding. In the same manner the base ring P has its downwardly extending flange P' provided with inwardly extending lugs T which are electrically welded to said flange. These lugs are provided with threaded apertures for engaging screws U which secure the supporting feet V to the flange P' and ring P. Screws W secure the ring P to the flanges N by which the ring P is attached to the hot plate and its casing. X is a metallic shank for a handle which is spot welded to the bottom H and projects outwardly therefrom, and Y is a handle secured thereto.

In use, the stand may be carried even when under heat, by the handle Y, and the food holding vessel S may be clamped or unclamped from the hot plate by a slight rotation. This will engage the cam-shaped beads with or disengage them from the flanges Q in a manner previously described. The pressing of the beads R from the metallic wall of the vessel avoids the necessity of separate flanges or lugs for locking.

What I claim as my invention is:

1. In an electrical cooking utensil, the combination with an electrically heated hot plate, of a supporting stand therefor comprising a cup-shaped pressed sheet metal member having its upwardly extending flange in marginal engagement with said hot plate, legs for said stand secured to said flange and provided with integral upwardly extending flanges, and a vessel seated on said hot plate having cam-shaped members for coöperating with said upwardly extending flanges on said legs to clamp said vessel to the hot plate.

2. In an electrically heated utensil, the combination with an electrically heated hot plate, of a cup-shaped pressed sheet metal member having a marginal bearing for said hot plate, a vessel seated upon said hot plate provided with a cam-shaped rib on the side wall thereof, and a supporting lug having a segmental portion welded to said cup-shaped member, a depending supporting portion and an outwardly, upwardly and inwardly extending flange portion for coöperating with said rib on said vessel to clamp the latter to said hot plate.

3. The combination with an electrically heated hot plate, of a cup-shaped pressed sheet metal member having the edge of its upwardly extending flange marginally engaging said hot plate, and a lug member formed of a sheet metal stamping having a portion welded to the inner face of said flange, a downwardly extending portion passing through a slit in the bottom of said cup-shaped member, and a segmental portion extending upwardly, outwardly and inwardly forming a retainer for engagement with a vessel upon said hot plate.

4. The combination with a hot plate, of a cup-shaped pressed sheet metal member having the edge of its upwardly extending flange in marginal engagement with said hot plate, a base ring below and spaced from said cup-shaped member, and a plurality of lug members formed of sheet metal stampings each having a portion lying adjacent to the inner face of said flange and welded thereto, a downwardly extending portion passing through a slot in the bottom of said cup-shaped member, and an integral outwardly, upwardly and inwardly bent segmental portion, the downwardly extending portion being secured to said base ring, and a vessel seated upon said hot plate having a rib for coöperation with said upwardly extending portion of said lug member to clamp said vessel to the plate.

5. The combination with an electrically heated hot plate, of a cup-shaped pressed sheet metal member having an upwardly extending flange with its upper edge in marginal engagement with said hot plate, a pressed sheet metal vessel seated on said hot plate having an outwardly pressed bead in the side wall thereof, a pressed sheet metal lug having a portion adjacent to the inner face of said upwardly extending flange and welded thereto, a downwardly extending lug portion passing through a slot in the bottom of said cup-shaped member, and an outwardly, upwardly and inwardly bent segmental portion for coöperating with said bead to clamp said vessel to said hot plate.

6. In an electrical cooking utensil, the combination with an electrically heated hot plate, of a supporting stand therefor, legs for the stand secured thereto, one of said legs being provided with an upwardly extending flange, and a vessel seated on said hot plate having a cam-shaped portion having an interlocking engagement with said upwardly extending flange.

7. In an electrical cooking utensil, the combination with an electrically heated hot plate, of a supporting stand therefor comprising a member having an annular upwardly extending flange in marginal engagement with said hot plate, a vessel seated on the hot plate, and means for clamping said vessel in place.

8. In an electrical cooking utensil, the combination with a supporting stand comprising a member having an annular upwardly extending flange, of a hot plate provided with an annular flange seated upon the margin of said upwardly extending flange, an electrical heating unit secured to the under face of said hot plate, a vessel seated on the hot plate, and means for detachably clamping said vessel to said stand.

In testimony whereof I affix my signature in presence of two witnesses.

FRANK KUHN.

Witnesses:
W. J. BELKNAP,
JAMES P. BARRY.